United States Patent [19]

Bolich

[11] Patent Number: 5,582,044
[45] Date of Patent: Dec. 10, 1996

[54] ADJUSTABLE SURFBOARD CLAMP AND METHOD

[76] Inventor: Gray Bolich, P.O. Box 261, Ventura, Calif. 93002

[21] Appl. No.: 577,065

[22] Filed: Dec. 22, 1995

Related U.S. Application Data

[63] Continuation of Ser. No. 262,749, Jun. 20, 1994, abandoned.
[51] Int. Cl.⁶ .................................................. C05B 69/00
[52] U.S. Cl. .......................................... 70/58; 70/19
[58] Field of Search .................................. 70/58, 57, 19, 70/33, 34; 211/60.1, 94

[56] References Cited

U.S. PATENT DOCUMENTS

| | | | |
|---|---|---|---|
| 4,326,747 | 4/1982 | Finnegan | 70/19 X |
| 4,340,376 | 7/1982 | Williams | 70/58 X |
| 4,459,832 | 7/1984 | Avrea et al. | 70/58 X |
| 4,526,125 | 7/1985 | Bain | 70/18 X |
| 4,712,394 | 12/1987 | Bull | 70/18 |
| 4,827,742 | 5/1989 | McDonald | 70/19 |
| 4,881,386 | 11/1989 | Glines | 70/19 |
| 4,896,519 | 1/1990 | Pitts | 70/58 |
| 4,938,040 | 7/1990 | Humphreys | 70/58 |
| 4,991,413 | 2/1991 | Arnaldo | 70/19 |
| 4,996,855 | 3/1991 | Havenga et al. | 70/58 X |
| 5,095,722 | 3/1992 | Chapmond | 70/18 |
| 5,119,649 | 6/1992 | Spence | 70/14 |
| 5,275,027 | 1/1994 | Eklof et al. | 70/58 X |
| 5,398,530 | 3/1995 | Derman | 70/58 |
| 5,442,941 | 8/1995 | Kahonen et al. | 70/33 X |

Primary Examiner—Steven N. Meyers
Assistant Examiner—Monica E. Millner
Attorney, Agent, or Firm—Richard L. Myers

[57] ABSTRACT

A method of locking a surfboard to a roof rack crossbar using a series of adjustable mount block assemblies (10a–b) affixed to the rack crossbars (13) at a lateral position of contact with the sides of a surfboard (15a–b) placed horizontally on top of the crossbars. The mount block assemblies utilize a metal clamp (12) that is vertically adjusted to the thickness of the surfboard at the lateral position of contact. An internal axle (14) connects two side cams (10b) vertically adjacent to a center mount block (10a) with clamp (12) affixed within the side cams. Axle (14) allows for the clamp assemblies to open and close by means of rotation of the side cams relative to the position of the mount block. The mount block assemblies utilize a lock pin (16a–b) that inserts through an alignment of holes in the mount block assembly to a position of engagement with a cam lock assembly (22a–f). Utility of the cam lock serves to prevent or allow removal of the lock pin. This clamping method prevents movement of a surfboard on the crossbar and deters theft.

8 Claims, 6 Drawing Sheets

ADJUSTABLE SURFBOARD CLAMP AND METHOD

This application is a continuation of application Ser. No. 08/262,749, filed Jun. 20, 1994, now abandoned.

BACKGROUND—FIELD OF THE INVENTION

This invention is an adjustable and locking clamp for securing surfboards and similarly shaped objects to car top roof racks.

BACKGROUND—DESCRIPTION OF PRIOR ART

The typical method of securing surfboards to car top roof racks is by a canvas or rubber strap. The strap is secured to the middle of the rack crossbar with a screw, and has a metal hook at the other end. Sometimes there is an elastic section or property to the strap. First a surfboard is placed on top of the crossbar, then the strap is pulled across the top of the surfboard and hooked into a retaining hole on the end of the crossbar. The elasticity of the strap provides a tension fit when the hook is passed through the retaining hole of the crossbar. Although this is the most typical method of securing surfboards to racks, them are obvious drawbacks. The flexible properties of the strap are subject to wear and tear and weathering which in time can result in breaking of the strap, which could cause a fatal accident if such breakage occurred in transit at highway speeds. In addition, the strap can easily be unhooked, resulting in theft of the surfboard.

To address the problem of theft inventors have devised several solutions. U.S. Pat. Nos. 4340376 to Williams (Jul. 20, 1982), 4526125 to Bains (Nov. 7, 1983), 4712394 to Bull (Dec. 15, 1987), 4938040 to Humphreys (Jul. 3, 1990), 5119649 to Spence (Jun. 9, 1992), all incorporate the use of a length of cable which is tethered to a surfboard or kayak at one end and looped around a rack crossbar or some other object, thus providing a loose fitting restraint to deter unauthorized removal of the surfboard or kayak. One drawback to these inventions is that the method of looping a cable around two objects and then inserting a padlock at some desired position is tedious and time consuming. Another drawback is that the cable can be cut with bolt cutters. Another drawback is that the cable remains loosely wrapped around the surf board, which still requires the method of conventional swapping to hold the surfboard to the roof racks during transit. Another drawback is that if the strap breaks while in transit, the surfboard would be a hazardous dangling object that could hit something in near proximity. Another drawback is that the cable can scratch, mar, or slice into the less dense material of the surf board.

Thus, the prior art cited results in limitations when used to secure surfboards to car roof racks:

(a) The use of straps with elastic properties provides only a tension fit.
(b) The straps are subject to weathering and can break.
(c) The straps can quickly and easily be unhooked resulting in theft of the surfboard.
(d) The use of a cable to deter theft is a loose fitting device which still requires the additional use of straps to hold the surfboard tight against the roof rack.
(e) The use of a cable to deter theft requires excessive manipulations which are time consuming and tedious.
(f) The cable can mar, scratch, or dig into the surface of the surfboard.
(g) The cable can be cut with bolt cutters.

OBJECTS AND ADVANTAGES

Accordingly, the adjustable surfboard clamp is an invention which has several advantages over the prior art cited:

(a) The clamp provides a rigid, mechanical method for mounting surfboards tight against the car roof rack.
(b) The clamp is laterally adjustable on the rack crossbar, and after the initial adjustment to the bar, the clamp remains in a fixed position so that it becomes a component part of the roof rack.
(c) The clamp is adjustable to enable a custom fit to any size and shape of surfboard which effectively prevents any movement of the surf board on the racks.
(d) The clamp is fast and easy to use because it has an internal locking mechanism and after the initial adjustment, the clamp opens and closes with minimal dexterity of movement.
(f) The clamp provides a high degree of theft deterrence because it is made of solid materials that resist cutting, bending, and breaking.
(e) The clamp provides a rigid, tight fit of the surfboard when mounted on the roof racks so that additional use of conventional straps is not required.
(f) The clamp has an additional coating of rubber or vinyl on the critical point of contact with the surfboard so that the board is protected from damage.

Further objects and advantages are to provide a secure locking device which will allow users of the adjustable surfboard clamp to pursue other time consuming activities with a true sense of security that their surfboard will still be locked on the racks when they return. Additionally, when a series of four clamps have been adjusted properly, practically no movement of the surfboard on the racks will be possible. Additionally, opening, closing, and locking of the clamps can be executed with only one hand if necessary.

DRAWING FIGURES

In the drawings, closely related pans have the same reference number with alphabetic suffixes. In the drawings, even numbered reference numbers designate the actual parts of the clamp, while odd reference numbers designate relevant parts and objects used in conjunction with my invention.

Figure 1:
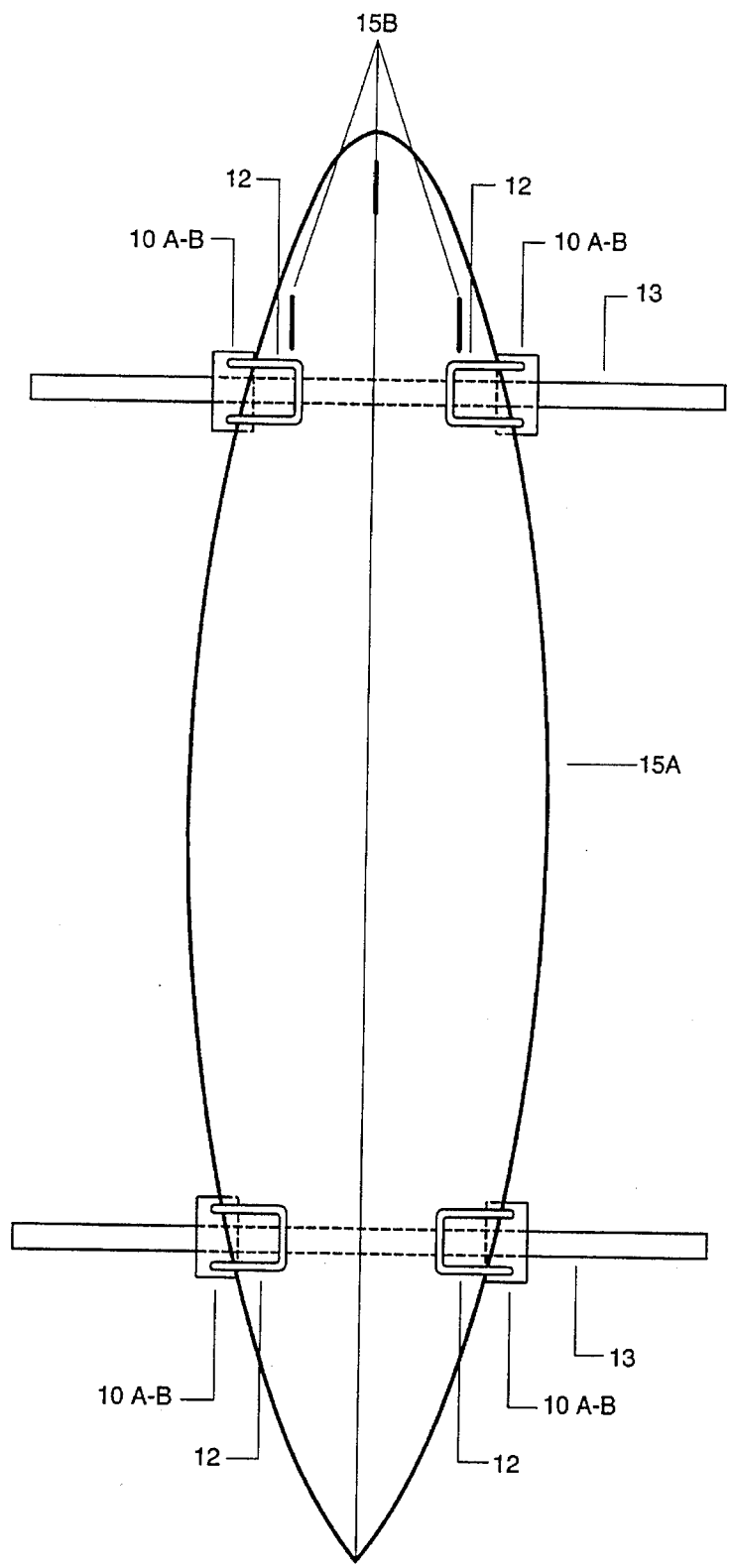
FIG. 1 shows an elevated view of four surfboard clamps locking a surfboard to two roof rack crossbars.

REFERENCE NUMERALS IN DRAWINGS 10 a-Mount block b-SideCam
12 Clamp
14 Axle
16 a-Lock Pin b-Lock Pin Knob
18 Clamp Set Screw
20 Mount block Set Screw
22 Cam Lock Assembly—a-Lock Housing b-Nut c-Orientation Ring d-Cam e-Lock Washer f-Screw
24 Round Crossbar Hole
26 Cam Lock Chamber
28 Lock Pin Hole
30 Clamp Hole
32 Axle Hole
34 Mount block Set Screw Hole
36 Clamp Set Screw Hole
38 Key
40 Radial Clamp
42 Lock Pin Notches
44 Padlock Tabs
46 Tab Screws
48 Lock Pin
50 Single Cam Axle
Axle Roll Pin
54 Rectangular Crossbar Hole

RELATED OBJECTS

13 Crossbar
15 a-Surfboard b-Surfboard Fins
55 Padlock

DESCRIPTION—FIGS. 1 THROUGH 6

A typical configuration of the clamp assemblies is shown in FIG. 1. Four mount block assemblies, 10a and 10b, are secured to a roof rack crossbar 13 at two corresponding narrow dimensions of an elongated surfboard 15. Clamps 12 insert into mount block assembly side cams 10b.

Figure 2:
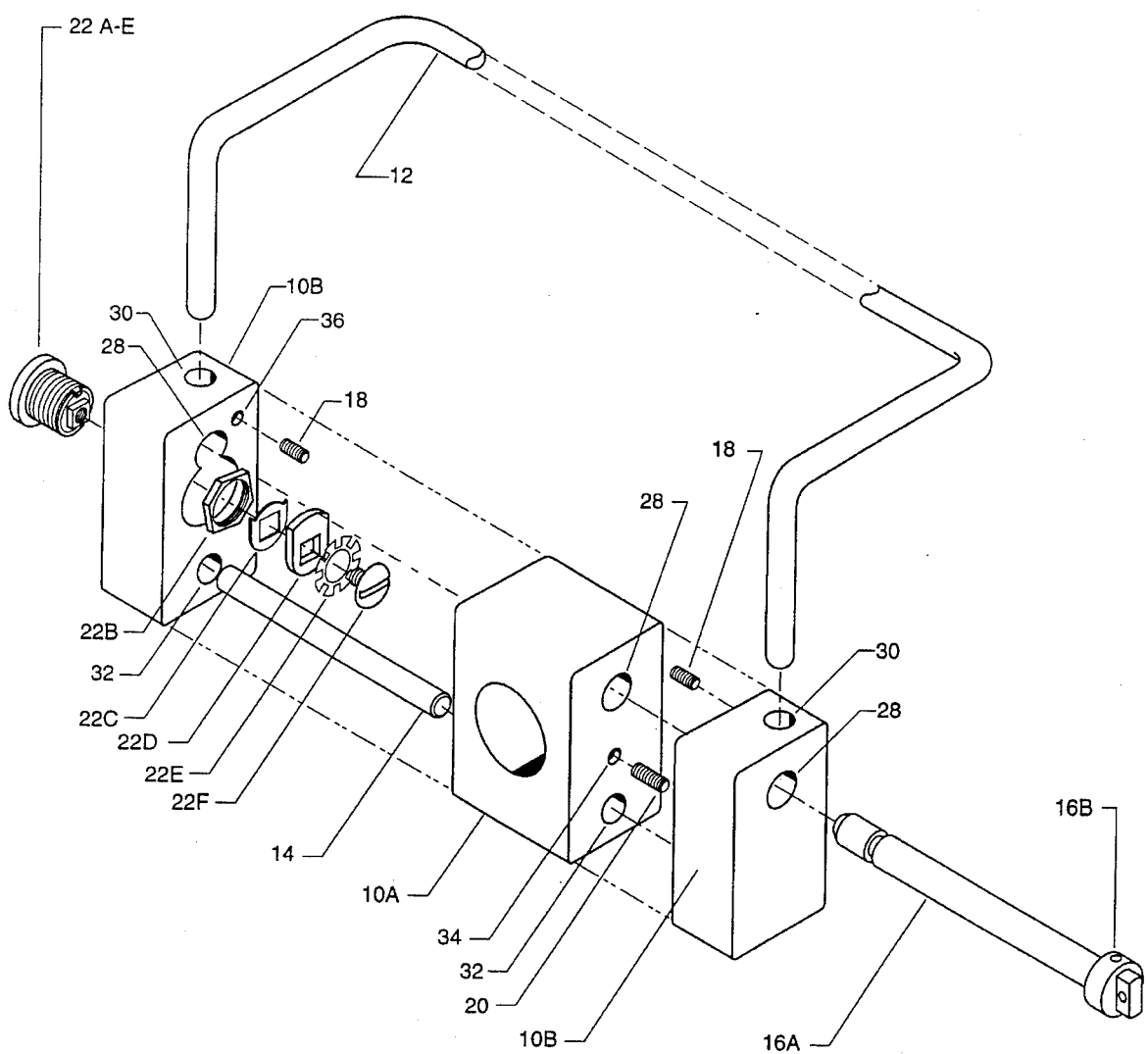
FIG. 2 shows an exploded view of the adjustable surfboard clamp assembly.

FIG. 2 illustrates the components of the surfboard clamp assembly. Mount block assembly 10a and 10b is an isometric block of solid plastic or metal which is divided on a vertical axis into a center mount block 10a, with two proportionate side cams 10b. Mount block 10a contains a crossbar mount hole 24, secured to the crossbar by a mount block set screw 20. Side cams 10b attach adjacent to mount block 10a with axle 14 at a perpendicular axis below crossbar mount block hole 24. Clamp 12 is rolled steel which is bent into a horseshoe shape at two parallel 90° angles on the vertical plane and two convergent 90° angles on the horizontal plane. The two end points of the clamp are at equal length on the vertical plane and exact parallel distance on the horizontal plane, which enables the clamp 12 to insert and move vertically within clamp holes 30. Clamp holes 30 are vertical through holes on side cams 10b and are off-center to allow for on-center insertion of axle 14 into axle holes 32, which are blind to cam 10b exterior. Clamp 12's position is secured by clamp set screws 18 which thread to clamp set screw holes 36, located on the interior face of side cam 10b.

Lock pin 16a–b inserts through mount block 10a and side cams 10b. Lock pin hole 28 is a through hole on one of side cams 10b, mount block 10a, and a blind hole on the opposing side cam 10b. Lock pin hole 28 is on-center at a position above and perpendicular to crossbar hole 24, and above and parallel to axle 14. Lock pin 16a–b is comprised of a round steel shaft with a beveled end with a flute, and a plastic lock pin knob 16b at the opposing end.

Cam lock chamber 26 is a two tiered through hole on one of side cams 10b. The top circumference of cam lock chamber 26 intersects the bottom circumference of lock pin hole 28. This intersection enables cam 22d to engage the flute of lock pin 16a when the cam lock assembly is activated with key 38. Cam lock chamber 26 is two tiered with a small diameter through hole on the external face of side cam 10b, and a larger diameter hole counter-bored from the internal face of side cam 10b. Cam lock housing 22a inserts from the external side of cam lock chamber 26. Cam lock nut 22b, orientation ring 22c, cam 22d, lock washer 22e, and screw 22f attach to cam housing 22a from the internal side of cam lock chamber 26 to form a cam lock assembly.

Mount block 10a and side cams 10b are made of impact-resistant plastic or anodized aluminum, preferably machined from solid material, while a chambered, injection-molded version would sacrifice strength for lower costs. Clamp, axle, lock pin and set screws are stainless steel, or cold-rolled steel with electrostatic plating to resist corrosion and weathering. Clamp 12 is coated with a protective layer of rubber or vinyl laminate (not shown in the drawings).

Figure 3:
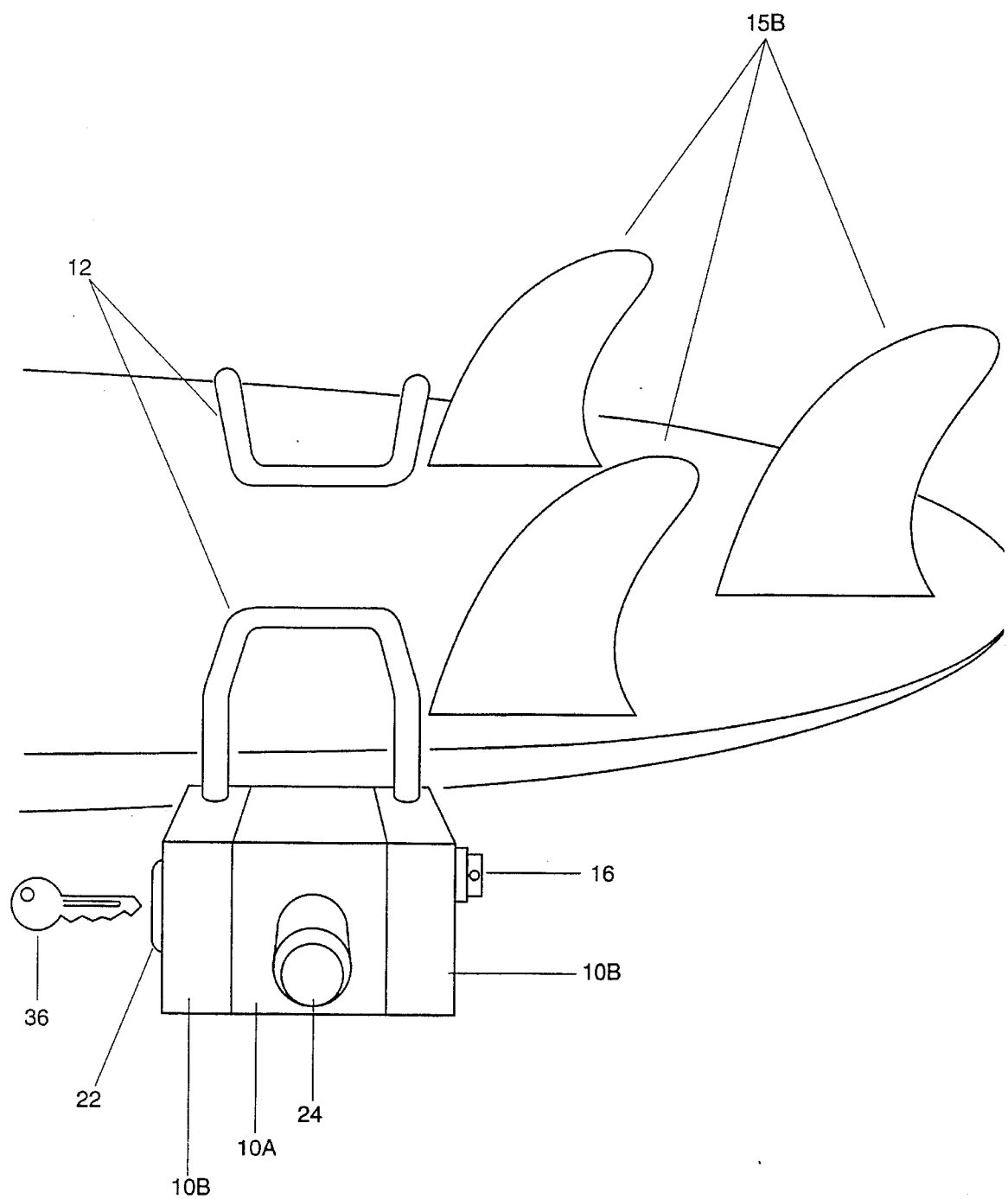
FIG. 3 shows a side view of two clamps in a typical position and adjustment at the bottom end of a three finned surfboard.

FIG. 3 is a slightly elevated side view of two adjustable surfboard clamp assemblies in a typical adjustment for a three finned surfboard, (bottom end of surfboard). Related crossbar is —shown in this figure. FIG. 3 shows the adjustable surfboard clamp assemblies in the closed position, with lock pin 16a–b inserted. Key 38 is used to activate cam lock assembly 22a–f, which engages the flute on lock pin 16a. The mount block 10a is adjusted laterally for the width of the surfboard at a position in front of leading fins. Clamp 12 is height adjusted for the corresponding thickness of the surfboard at that position. With a three finned surfboard, the placement of the adjustable surfboard clamp directly in front of the leading fins provides a stop that prevents forward movement of the surfboard, while the position of the mount block 10a at a narrow dimension of the surfboard template prevents rear movement of the surfboard.

Figure 4:
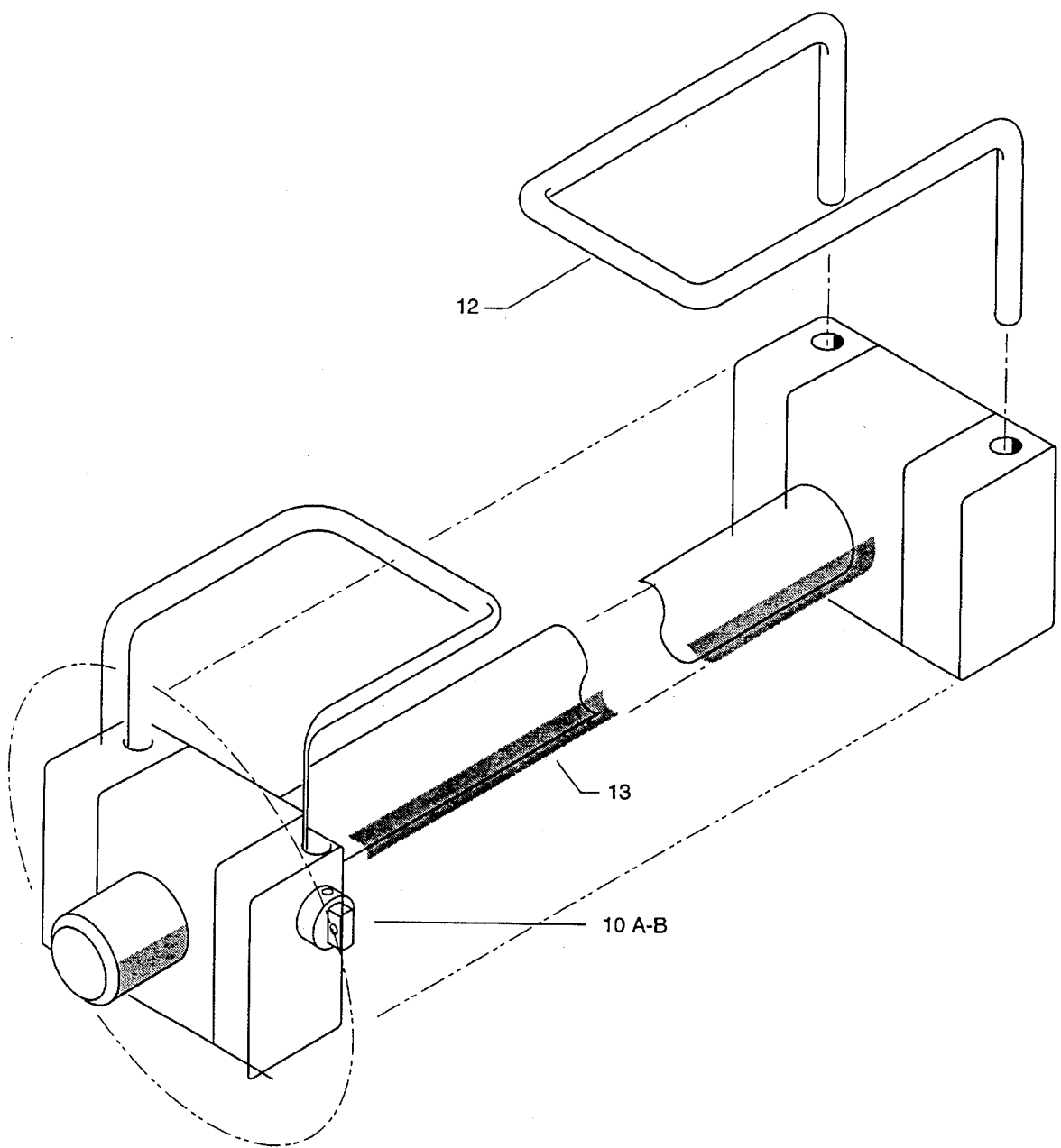
FIG. 4 shows a clamp in alternate positions of lateral, height, and rotational adjustment on a round crossbar. The lateral placement of the mount block assembly and insertion of the clamp are reversible.

FIG. 4 shows clamp 12 and mount block 10a–b in alternate positions on a round crossbar 13. These positions and all variations of position of the mount block 10a–b on the horizontal plane and clamp 12 on the vertical plane, are facilitated by the tightening of the mount block set screw 20, and clamp set screw 18. Thus, in the closed and locked position of the adjustable surfboard clamp, the internal access to these adjustments is inaccessible and secure.

Figure 5:
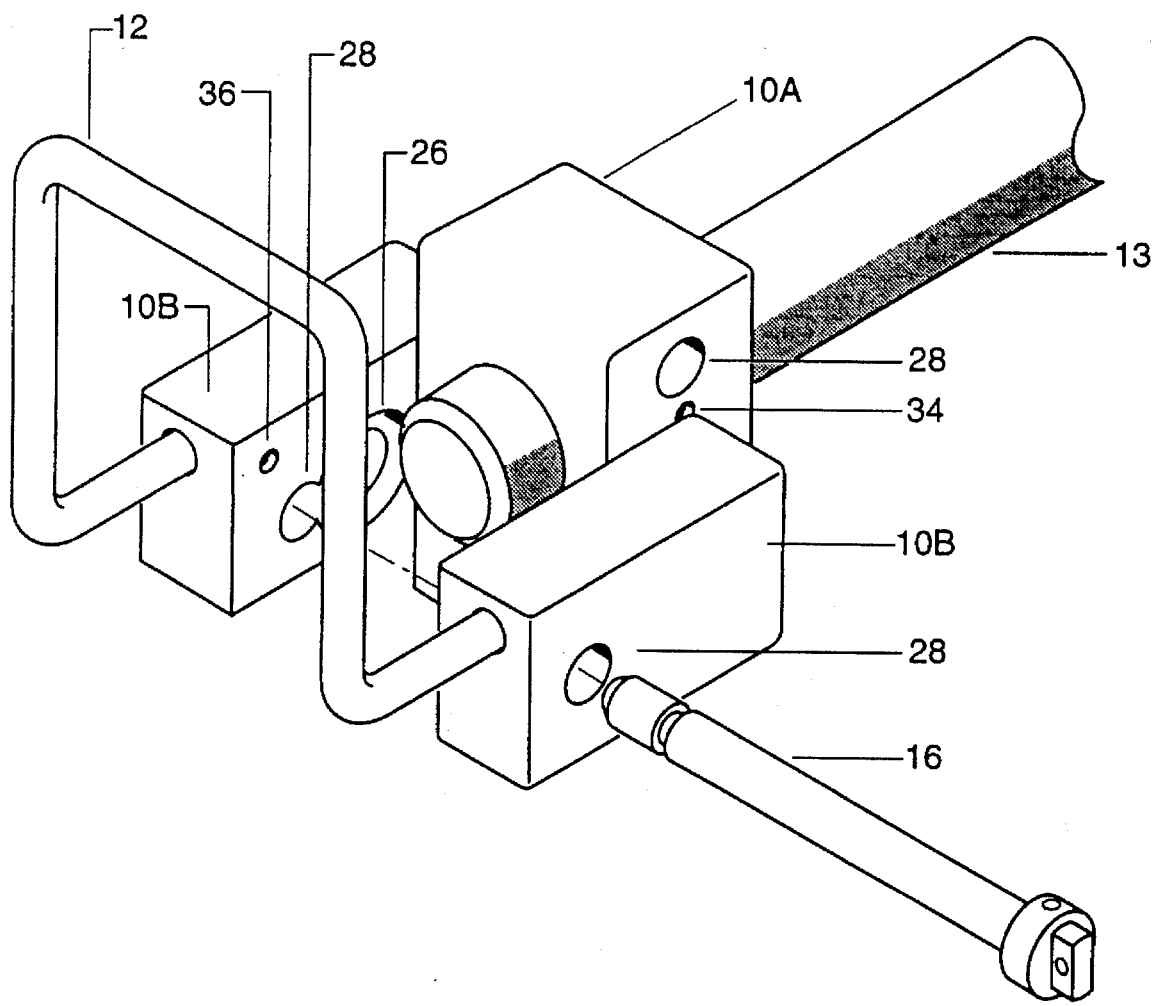
FIG. 5 shows the clamp in the open position with the lock pin removed.

FIG. 5 shows the adjustable surfboard clamp on a round crossbar in the open position. Lock pin 16a–b is removed from mount block 10a–b assembly. Side cams 10b pivot on axle 14. Position of side cams 10b adjacent to mount block 10a, are maintained by insertion of clamp 12. Clamp 12 is secured by the internal threading of clamp set screws 18. Lock pin 16a–b is disengaged and removed by unlocking cam lock 22a–f. The clamp assembly pivots open to allow removal of the surfboard from the crossbar.

Figure 6:
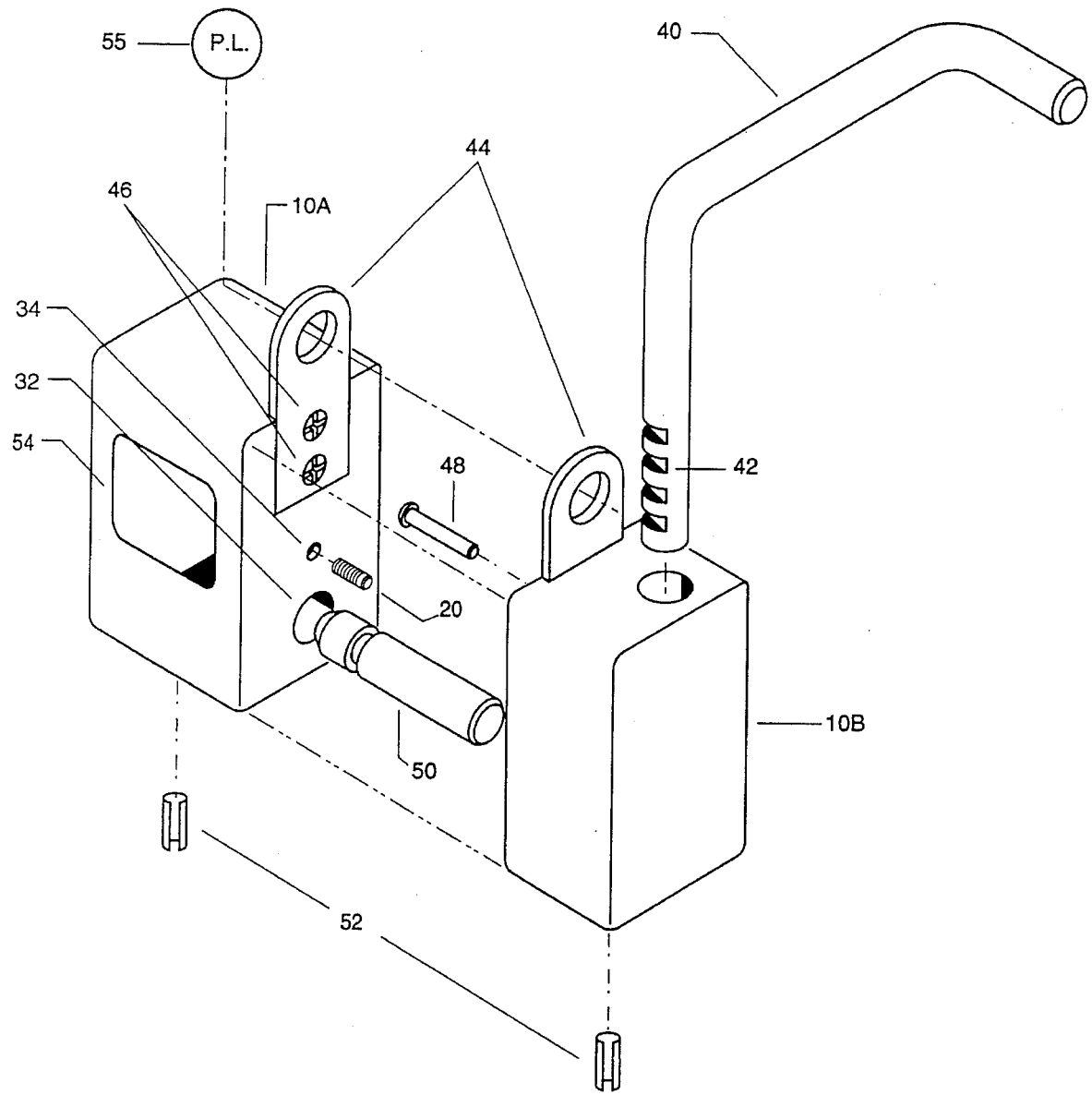
FIG. 6 shows an alternative embodiment with a single cam mount block assembly, a radial clamp, and an external padlock that inserts through the padlock tabs.
Figure 4:
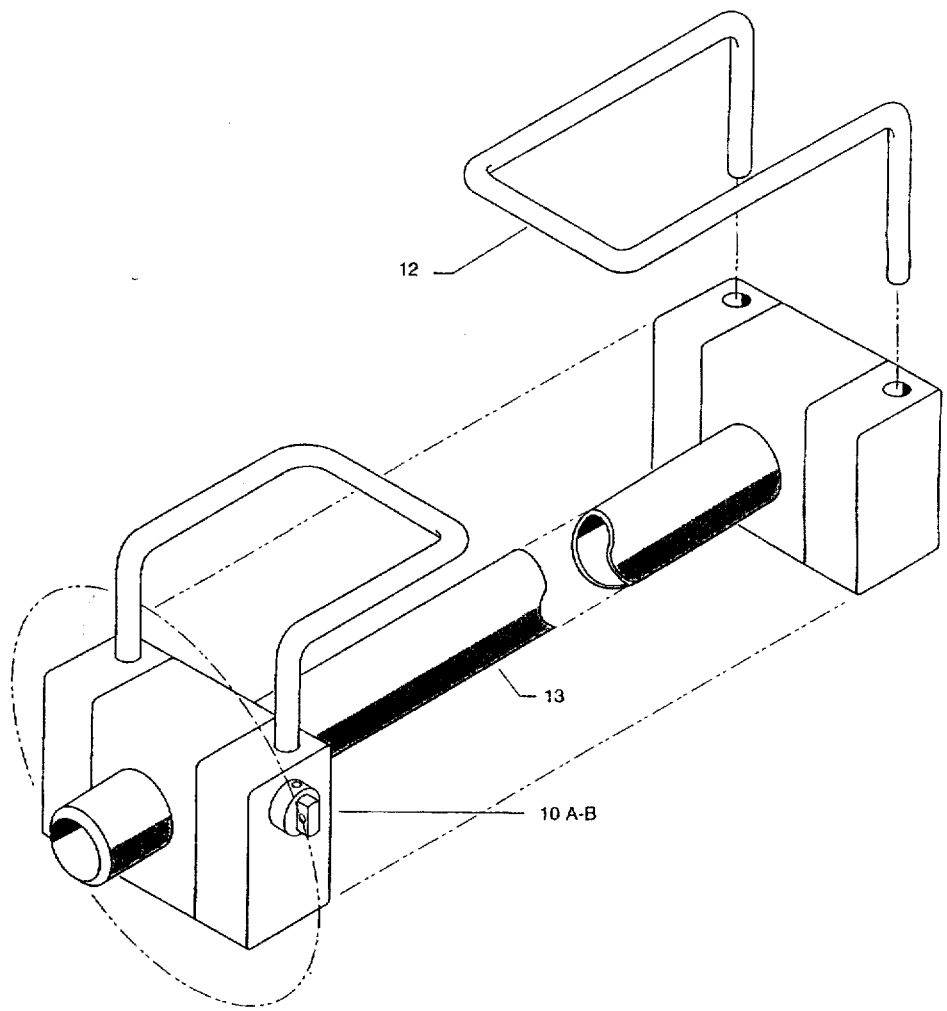

FIG. 6 shows one of the possible alternative embodiments of the adjustable surfboard clamp. Mount block 10a has a rectangular crossbar hole 54, for mounting on to a rectangular crossbar. A blind axle hole 32 is made below and perpendicular to hole 54. Mount block set screw 20 and mount block screw hole 34, are located on center on the interior side of mount block 10a. Single side cam 10b is connected adjacent to mount block 10a by single cam axle 50 which inserts into a blind hole on side cam 10b. Axle roll pins 52 insert through blind holes on mount block 10a and side cam 10b. On side cam 10b roll pin 52 inserts half way into axle 50. On mount block 10a roll pin 52 intersects a flute in axle 50, which allows side cam 10b to pivot, relative to mount block 10a.

Two padlock tabs 44 are mounted flush surface to the interior face of mount block 10a and side cam 10b. Padlock tabs 44 are secured to mount block 10a and side cam 10b by two screws each. The tabs extend vertically above the top of mount block 10a and side cam 10b. The tabs are in respective alignment when the clamp assembly is in the closed position. Padlock holes are machined on the upper portion of the tabs for insertion of a generic padlock.

Radial clamp 40 is a round steel shaft with one 90° bend on the vertical plane and a short section bent 90° on the horizontal plane. Semicircular lock pin notches 42, are machined on the lower vertical portion of the clamp shaft, on the opposing side from the vertical clamp bend. A vertical through hole is made off-center on side cam 10b for insertion of the radial clamp 40. Lock pin 48 inserts on the interior face of side cam 10b to a blind hole with counter bored chamber to allow for a recessed position of lock pin 48 relative to the interior surface of side cam 10b. The counter bored chamber is twice the diameter of the lock pin head to allow for the removal of the pin from side cam 10b. Insertion of lock pin 48 intersects one of the lock pin notches 42, on radial clamp 40. On radial clamp 40, lock pin holes could be used instead of notches.

Operation FIG. 1

Four adjustable surfboard clamp assemblies are positioned on two roof rack crossbars 13 at two respective narrow dimensions of a surfboard 15a–b. Clamps 12 insert into side cams 10b. With this method of containment, the surfboard is not moveable in any direction.

Operation FIG. 2

Mount block set screw 20 attaches mount block assembly 10a–b to crossbar 13. Axle 14 attaches side cams 10b adjacent to mount block 10a. Axle 14 allows side cams 10b to pivot relative to mount block 10a. Clamp 12 inserts through side cams 10b and prevents side cams from slipping off axle 14. Clamp set screws 18 allow for adjustment and securing of clamp height relative to surf board thickness. Lock pin 16a–b inserts through side cams and mount block and prevents rotation of side cams, and closes the clamp assembly. Cam 22d intersects the flute of lock pin 16a. Thus, the function of cam lock assembly 22a–f is to prevent or allow removal of the lock pin 16a–b from the mount block assembly.

Operation FIG. 3

This figure depicts the method of locking a genetic three finned surfboard at only the bottom end of the surf board. On this type of surfboard design, two fins are located near the outside edge of the board. For this method of locking, the adjustable surfboard clamp assemblies are positioned directly in front of the two outside fins and in contact with the sides of the surfboard. The lock pin 16a–b is inserted through the clamp assembly to prevent opening, and the cam lock assembly 22a–f is locked with key 38. With a three tinned surfboard, the vertical obstruction of the two fins against clamp 12 prevents forward movement of the surf board, and sideways and backward movement is prevented by the width of the surfboard constrained by the lateral fixed position of mount block assemblies 10a–b. Thus, an acceptable degree of locking security is achieved with two adjustable surfboard clamp assemblies on one crossbar. Use of additional clamp assemblies on the second crossbar is optional and would likely be forgone in economical preference for using a traditional elastic strap on the second crossbar.

Operation FIGS. 4–5

FIGS. 4 and 5 illustrate the unique functionality of the adjustable surfboard clamp. The clamp assembly moves laterally along a crossbar to adjust to any width of any type of surfboard. Additionally, the clamp assembly can rotate on a round crossbar to facilitate a close fit to the variable curvatures along the length of any surfboard. Clamp 12 adjusts vertically within side cams 10b to facilitate a secure fit to the thickness of any surfboard.

FIG. 5 shows the adjustable surfboard clamp in the open position. Initial adjustment is made for a particular surfboard by tightening down the mount block set screw 20 and clamp set screws 18, while the clamp assembly is in the open position. After the initial adjustment, side cams 10b and clamp 12 pivot up to the vertical position and lock pin 16a–b inserts through the clamp assembly and is locked with cam lock assembly 22a–f. Insertion of the surfboard is accomplished by unlocking and opening the clamp assembly on one side of the crossbar and sliding the surf board horizontally across the crossbar and under the rigid clamp of the locked clamp assembly on the opposing side of the crossbar. Removal of the surfboard is accomplished by unlocking cam lock 22a–f, removing lock pin 16a–b, and pivoting side cams 10b to the open position, and sliding the surfboard off the crossbar.

Thus, once the initial adjustments to the clamp assemblies are made, the adjustable surfboard clamp provides a fast and convenient way to secure and lock surfboard to car roof racks. The adjustable surfboard clamp is fully adjustable to provide a rigid mechanical fit to a wide range of surfboard shapes and dimensions. It provides an internal locking mechanism to deter theft. It provides added safety against accidental surfboard detachment when the host vehicle is in motion. In the locked position, the clamp assembly is immovable and access to the internal adjustments of the assembly are impossible.

Operation FIG. 6

FIG. 6 shows one of the possible alternative embodiments of the adjustable surfboard clamp. A single side cam 10b attaches to mount block 10a with single cam axle 50. Axle roll pins 52 connect the cam and the mount block to the axle. The axle is fluted on the mount block side which allows the side cam to pivot in relation to the fixed position of the mount block. The mount block is secured to the crossbar with a mount block set screw 20 on the internal face. Radial clamp 40 inserts to the side cam through hole. The radial clamp is notched, or has a linear alignment of holes (not shown in the drawings) on the lower portion of the clamp shaft. Insertion of an internal lock pin 48 from the internal face of side cam, intersects a given notch or hole of the radial clamp. Thus, a precise adjustment to a given surfboard is achieved by securing the position of the mount block according to the width of a surfboard on the crossbar and locking the radial clamp with an internal lock pin according to the corresponding thickness of the surfboard at the point of clamp contact. In FIG. 6 a generic padlock is used to provide an external means of locking the clamp assembly. The padlock shank inserts through the holes of the padlock tab. The holes are in alignment when the clamp assembly is in the vertical, closed position.

FIG. 6 illustrates an alternative design which utilizes simpler mechanics and has fewer parts than the dual side cam assembly shown in FIGS. 1–5. However the intrinsic functionality, advantages, and purpose of the two designs are the same.

Both assemblies retrofit to a roof rack crossbar. Two initial adjustments are made to ensure a precise mechanical fit to a given surf board width and thickness to prevent movement of the surf board. The assemblies unlock and open to allow quick removal of the surfboard. The surfboard can be remounted and locked quickly. The assemblies provide a lock to deter theft. The assemblies provide mechanical security against accidental detachment of the surfboard when the host vehicle is in motion. In the locked position, the clamp assemblies are immovable and access to the internal adjustments of the clamp assemblies are impossible.

SUMMARY, RAMIFICATIONS, AND SCOPE

The use of the adjustable surfboard clamp will provide advantages and safety features that the known prior art does not offer. The adjustable surfboard clamp is designed to be retrofitted to the crossbar of commercially available roof top racks, and with two simple adjustments becomes a component part of the existing roof rack. The adjustable surfboard clamp provides a convenient method of securing a surfboard to an existing roof rack. The adjustable surfboard clamp provides more safety when traveling, and it has an internal locking feature that deters theft or tampering when the surfboard is left unattended over an extended period of time. Additionally the use of the adjustable surfboard clamp provides practical benefits such as being able to partake in activities such as dinning, shopping, etc. Another benefit is that by using a second series of adjustable surfboard clamps on the host vehicle, the user can travel with two surfboards at the same time. Thus, the locking feature allows the user of this invention a choice of using one surfboard for a period of time, while the second surfboard remains locked and unattended. Additionally, the use of the adjustable surfboard clamp offers a better alternative than the tradition of locking the surfboard inside the car, because the consequent build-up of intense heat inside the car has adverse affects on the surfboard, and the auto upholstery, when surfboard wax melts into the fabric. Also locking the surfboard inside the car could result in broken windows in the attempt of theft. These practical advantages result in a psychological "piece of mind", by mitigating the fear of a stolen surfboard, or a surfboard detachment in transit, and a sense of freedom to partake in various other activities over a prolonged period of time.

Accordingly, the adjustable surfboard clamp provides superior functionality over the known prior art in that:

it retrofits to an existing roof rack crossbar;

it provides two internal adjustments that allow a precise mechanical fit to a given surfboard width and thickness;

after these two adjustments are made, the adjustable surfboard clamp becomes a component part of the existing roof rack;

the adjustable surfboard clamp can be re-adjusted to fit a different surfboard;

it unlocks and opens quickly to allow removal of the surfboard, which can be remounted and locked quickly;

it provides a rigid mechanical fit that prevents any movement of the surfboard;

in the locked position the adjustable surfboard clamp is immovable and access to the internal adjustments are not possible;

the adjustable surfboard clamp utilizes an internal lock that deters theft.

Although the description above contains many specificities, these should not be construed as limiting the scope of the invention, but merely as providing illustrations of some of the presently preferred embodiments of this invention.

For instance, there are different shapes for rack crossbars, rectangular, square, elliptical, in addition to round. Thus, the shape of the crossbar through hole on the mount block will out of necessity be manufactured to allow a retrofit to the most common profiles of crossbars. Additionally, the clamp shape and size can be changed to accommodate uses other than locking surfboards. For example this invention can very well be used to secure ladders to crossbars, if the ladders have a series of slots along both sides, so that the adjustable surfboard clamp can close in a position that intersects the slots of the ladder, thus providing the same benefits of use.

Another embodiment of this invention is to manufacture a custom article that serves as a clamp receiver. Then various methods of attaching the clamp receiver to objects such as bicycles, skis, kayaks, ladders, etc. will provide the same benefits of use as the adjustable surfboard clamp. In such an embodiment the adjustable surfboard clamp can be used unmodified to insert into the customized clamp receiver when it is attached to various objects. Thus, the same benefits of safety, security and theft deterrence would transfer to the clamp receiver equipped objects. Additionally, embodiments of the adjustable surfboard clamp can be used to attach objects to scaffolding, or to a moving assembly line, where a rigid mechanical means of attaching an object, with the ability to quickly lock and release this object would be a benefit to the production process.

The use of different locks, whether internal or external, will result in many new embodiments of this invention. For instance an internal locking method that is wholly contained within the mount block assembly would be an improvement to the locking methods illustrated, because such a mechanism would eliminate the need for an external lock pin or a padlock. A small dead bolt lock housed inside the mount block would be depressed by the strike of a side cam when the assembly is closed. Simultaneously the dead bolt will repel into a blind hole on to internal face of the side cam the achieve locking. A key turn of the lock results in the dead bolt retraction from the side cam and the opening of the clamp assembly. If the dead bolt operates electronically, the use of a key will be eliminated also.

Another improvement to the lock mechanism will use a ratchet attachment on the axle. An internal spring loaded lock will engage the notches of the ratchet when the side cam is pivoted into the closed position. A key turn will disengage the spring-loaded lock from the notches of the ratchet, allowing the clamp assembly to pivot open.

In fact, there are many potential variations in the use of different locks and locking methods. However all of these variations and alternate embodiments will serve the same purpose, which is to provide a rigid lockable connection between the side cams and the mount block.

Thus, the scope of this invention should be determined by the appended claims and their legal equivalents, rather than by the examples given.

I claim:

1. A carrier in combination with a surfboard and a vehicle, releasibly fixing the surfboard to said vehicle, said carrier comprising:

a mounting bar disposed in a fixed relationship with the vehicle and positionable to extend along a first axis laterally of the vehicle;

a first block movable along the mounting bar to engage the surfboard at a first location along the surfboard;

a second block movable along the mounting bar to engage the surfboard at a second location along the surfboard opposed from the first location along the surfboard; and an extension member positioned on a second axis extending through the first block transverse to the first axis of the mounting bar, the extension member being pivotal on the second axis between a first position wherein the extension member proximate the surfboard to maintain the surfboard in a fixed relationship with the carrier, and a second position angularly displaced from the first position wherein the extension member is spaced from the surfboard to permit removal of the surfboard from the carrier.

2. The carrier recited in claim 1 further comprising:

at least one side block disposed in juxtaposition to the first block and being pivotal on the second axis relative to the first block; and attachment apparatus for fixing the extension member to the at least one side block to maintain the extension member in a pivotal relationship with the first block.

3. The carrier recited in claim 2 wherein the attachment apparatus comprises:

portions of the at least one side block defining an elongate recess sized and configured to receive the extension member; and a set screw extending into the elongate recess to engage the extension member at a third position wherein the extension member has a proximal relationship with the surfboard and a fourth position radially spaced from the third position wherein the extension member has a spaced relationship with the surfboard.

4. The carrier recited in claim 2 wherein the at least one side block is a first side block, and the carrier further comprises:

a second side block disposed in juxtaposition to the first block in a fixed opposing relationship with the first side block; and the second side block being pivotal on the second axis relative to the first block.

5. The carrier recited in claim 4 wherein the extension member is disposed in a fixed relationship with the first side block and the second side block to maintain the first side block and the second side block in a fixed relationship to each other and a common pivotal relationship with the first block.

6. The carrier recited in claim 3 wherein the set screw is accessible when the at least one side block is in the second position and the set screw is inaccessible when the at least one side block is in the first position.

7. The carrier recited in claim 6 further comprising:

a lock carried by the at least one side block and operable to releasibly engage the first block when the extension member is in the first position.

8. A method for releasibly attaching a surfboard to a vehicle, comprising the steps of:

fixing a mounting bar to the vehicle with the first axis of the mounting bar extending laterally of the vehicle;

providing a first block movable along the mounting bar to engage the surfboard, a side block mounted on a second axis extending through the first block and pivotal on the second axis between a first position in a proximate relationship to the surfboard and a second position in a spaced relationship with the surfboard, and an extension member carried by the side block and extendable generally radially of the second axis between a third position in a proximate relationship with the surfboard, and a fourth position in a spaced relationship with the surfboard; and alternatively moving the side block from the second position to the first position, and moving the extension member from the fourth position to the third position, to engage the surfboard and maintain the surfboard is a fixed relationship with the carrier.

* * * * *

UNITED STATES PATENT AND TRADEMARK OFFICE
CERTIFICATE OF CORRECTION

PATENT NO. : 5,582,044
DATED : Dec. 10, 1996
INVENTOR(S) : Gray Bolich

It is certified that error appears in the above-indentified patent and that said Letters Patent is hereby corrected as shown below:

Column 1, line 49, change the word "swapping" to - "strapping".

Column 2, line 45, change the word "pans" to - "parts".

The drawing sheet consisting of Fig. 4, should be deleted to be replaced with the drawing sheet, consisting of Fig. 4, as shown on the attached page.

Signed and Sealed this

Twenty-fourth Day of June, 1997

*Attest:*

BRUCE LEHMAN

*Attesting Officer*    *Commissioner of Patents and Trademarks*